US008055672B2

(12) United States Patent
Djugash et al.

(10) Patent No.: US 8,055,672 B2
(45) Date of Patent: Nov. 8, 2011

(54) DYNAMIC GRAPHICAL DATABASE QUERY AND DATA MINING INTERFACE

(75) Inventors: Judy Immaculate Tina Djugash, New Brighton, MN (US); Hoa Thu Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1518 days.

(21) Appl. No.: 10/865,261

(22) Filed: Jun. 10, 2004

(65) Prior Publication Data

US 2005/0278286 A1    Dec. 15, 2005

(51) Int. Cl.
*G06F 7/00* (2006.01)
(52) U.S. Cl. ............... 707/766; 707/805; 707/717
(58) Field of Classification Search .............. None
See application file for complete search history.

(56) References Cited

U.S. PATENT DOCUMENTS

| 7,055,098 | B2 | 5/2006 | Hull et al. | |
|---|---|---|---|---|
| 2003/0065650 | A1* | 4/2003 | Annand et al. | 707/3 |
| 2003/0069882 | A1* | 4/2003 | Nieswand et al. | 707/5 |
| 2003/0212669 | A1* | 11/2003 | Dedhia et al. | 707/3 |
| 2004/0117392 | A1 | 6/2004 | Burgmeier | |
| 2004/0186840 | A1* | 9/2004 | Dettinger et al. | 707/100 |
| 2004/0220927 | A1* | 11/2004 | Murthy et al. | 707/4 |

OTHER PUBLICATIONS

M. Adan et al., "IBM Data Discovery and Query Builder: Plug-ins by Example," Redpaper (ibm.com/redbooks), Jul. 2003.
Special Edition Using Microsoft Office XP, Ed Bott and Woody Leonhard, May 2001, Associate Publisher Greg Wiegand, pp. 277-278.

\* cited by examiner

*Primary Examiner* — Hosain Alam
*Assistant Examiner* — Christopher J Raab
(74) *Attorney, Agent, or Firm* — Martin & Associates, LLC; Derek P. Martin

(57) ABSTRACT

A graphical query and data mining interface provides visual feedback to a user during the construction of a query that helps the user determine the quality of the query as the query is being built. The graphical query and data mining interface determines relationships in the database from a database relationship document, such as an XML document. These relationships may be between columns, including columns in different tables. The relationship of columns in the database is then graphically displayed to a user. When the user selects a column in the database, a filtered display mechanism displays only those columns or records that satisfy the portion of the query already constructed. In this manner dynamic information is provided to the user as the user builds the query that indicates to the user the quality of the query.

28 Claims, 11 Drawing Sheets

DYNAMIC GRAPHICAL DATABASE QUERY AND DATA MINING INTERFACE

BACKGROUND OF THE INVENTION

1. Technical Field

This invention generally relates to computer systems, and more specifically relates to apparatus and methods for querying a database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

One problem with using queries to retrieve information from a database is that using queries typically requires specialized knowledge of a query language, such as Structured Query Language (SQL), as well as detailed knowledge of the database and its relationships. There are many applications where a person needs to query a database, but does not have the detailed knowledge of a query language or the details of the database. Some efforts have been made to provide a graphical query interface that allows a person that does not know SQL to query a database. The main focus of these known graphical query interfaces is abstracting the database and providing an easy-to-use interface for building queries. One problem with these known graphical query interfaces is a user can construct queries that are not very meaningful because they return no data, or because they return thousands or millions of records. Because the graphical query interface abstracts the details of the database to the user, the user has no idea whether two tables might represent disjoint sets of data. As a result, the user receives no feedback from known graphical query interfaces regarding the quality of the query until the query is completely built and then executed. If the size of the dataset is too large or too small, the user has no information regarding relationships in the database that allow the user to modify the query to return an acceptable dataset.

The result in the prior art is the generation of queries that are not terribly useful because they return a dataset that is too large or too small to be useful. Without a way to generate queries in a way that provides an indication of the quality of the query before the query is executed, the computer industry will continue to suffer from the generation and execution of queries that do not return a useful dataset.

DISCLOSURE OF INVENTION

A graphical query and data mining interface provides visual feedback to a user during the construction of a query that helps the user determine the quality of the query as the query is being built. The graphical query and data mining interface determines relationships in the database from a database relationship document, such as an XML document. These relationships may be between columns, including columns in different tables. The relationship of columns in the database is then graphically displayed to a user. When the user selects a column in the database, a filtered display mechanism displays only those columns or records that satisfy the portion of the query already constructed. In this manner dynamic information is provided to the user as the user builds the query that indicates to the user the quality of the query.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

Figure 1:
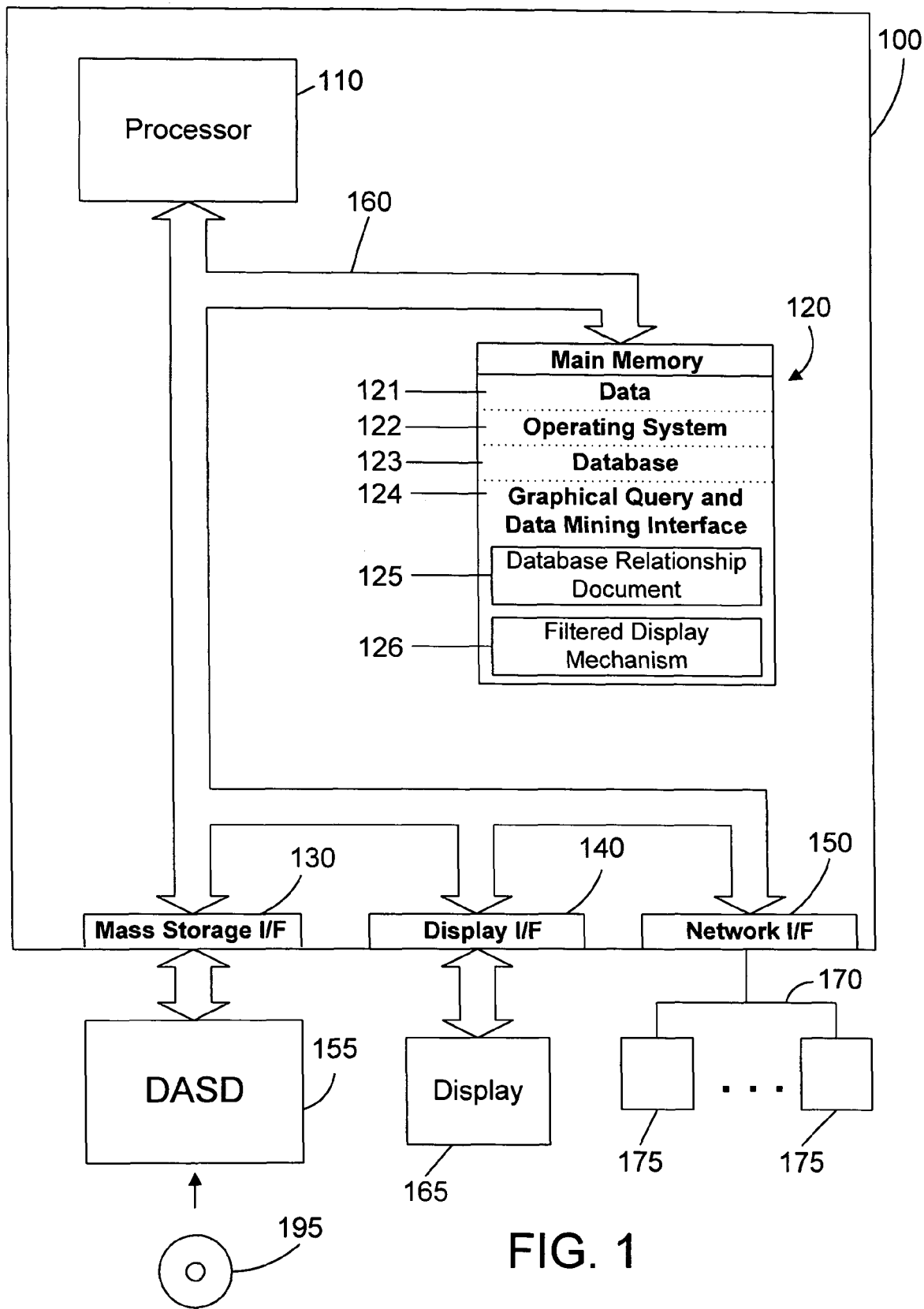
FIG. 1 is a block diagram of an apparatus in accordance with the preferred embodiments.

The present invention relates to database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. SQL is very powerful for those who have detailed knowledge of SQL and who have detailed knowledge of the database being queried. However, there are a growing number of circumstances where people who do not have a detailed knowledge of SQL or the database need to be able to query the database. As a result, graphical query interfaces have been developed that help a user to query a database even if the user does not know SQL and does not know the detailed relationships in the database. For example, IBM Corporation has developed an object oriented framework known as a Data Discovery and Query Builder. This framework abstracts out the query layer from the user and lets the user build queries using a graphical interface. For example, medical researchers that perform DNA mapping may need to access data in a very large database. A graphical query interface could be defined that uses the Data Discover and Query Builder framework that allows the researcher to access information in the database without writing SQL queries and without understanding many of the relationships in the database.

The emphasis with the Data Discovery and Query Builder framework and with other known graphical query interfaces is to provide data abstraction and analysis plugins. Known graphical query interfaces do not allow a user to view database relationships, and do not filter displayed selections based on the portion of the query that has already been defined. As a result, the user, who does not have detailed knowledge of the database relationships, may define a query that could return millions of records, or could define a query that returns no records. Known graphical query interfaces provide no feedback to the user regarding the quality of the query they are building. As a result, the user may spend time building a query only to find out after executing the query that the query did not return the desired data. The user must then guess at what changes to make to the query so that it returns the desired data.

Figure 3:
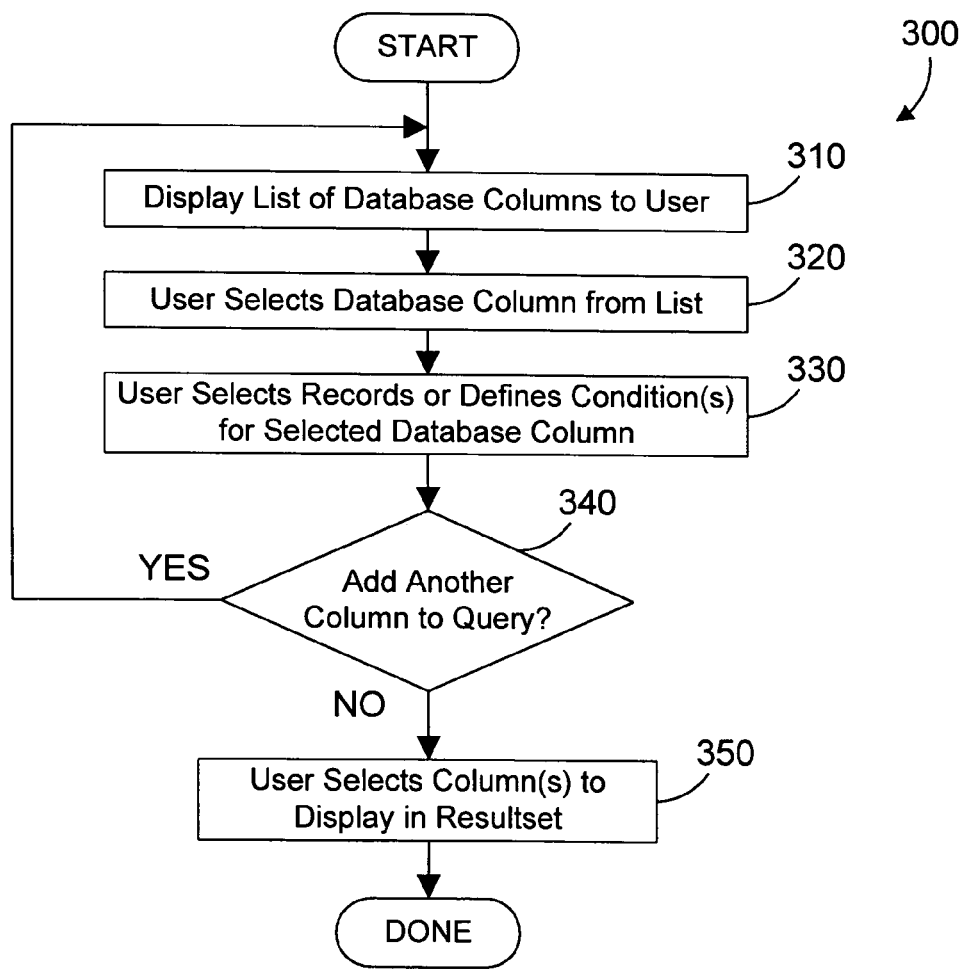
FIG. 3 is a flow diagram of a prior art method executed by a known graphical query interface.

An example will illustrate the deficiencies in prior art graphical query interfaces. Referring to FIG. 3, a prior art method 300 for graphically building a query begins by displaying a list of database columns to the user (step 310). The user selects a database column from the list (step 320). The user may then select individual records, or may define one or more conditions for the selected database column (step 330). If no other columns need to be added to the query (step 340=NO), the user then selects the column or columns to display in the resultset (step 350). If another column needs to be added to the query (step 340=YES), method 300 loops back to step 310 and continues.

One of the problems in method 300 is that all the available columns in the database are displayed to the user in step 310. This is true even when a query has been partially built that would eliminate a vast majority of the columns from consideration. A simple example will help to illustrate, as shown graphically in FIGS. 4-11.

Figure 4:
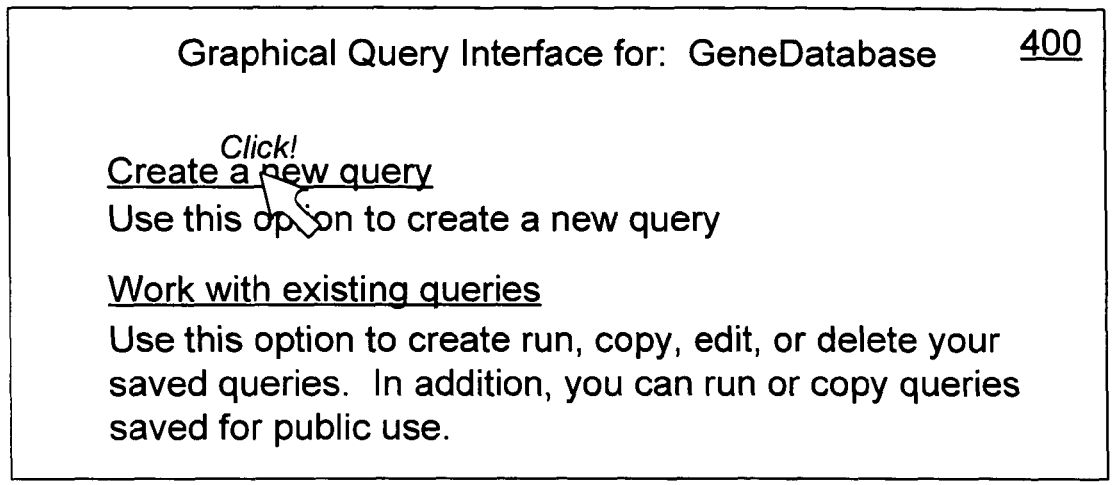
FIG. 4 is a display of one sample screen in a known graphical query interface.
Figure 5:
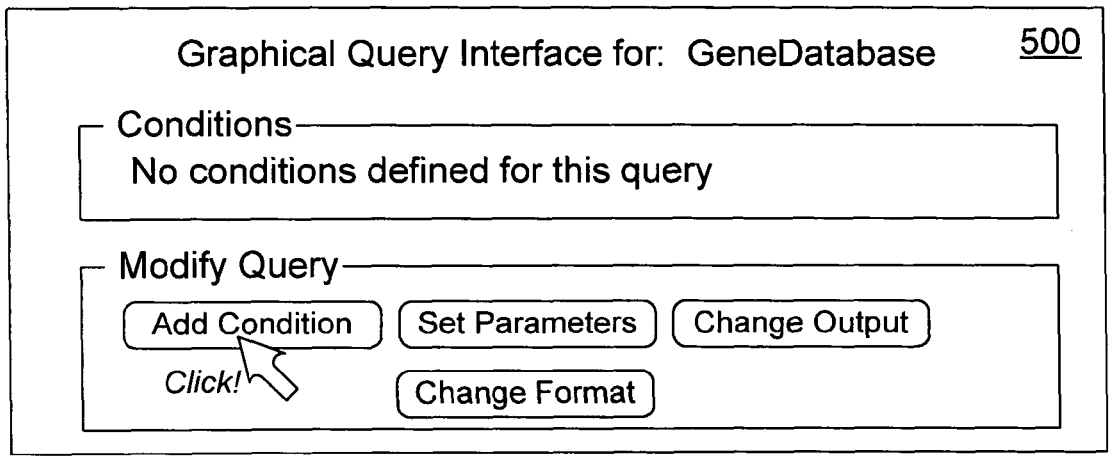
FIG. 5 is a display of a sample screen in a known graphical query interface that is displayed in response to the user selecting the "Create a new query" link on the display in FIG. 4.
Figure 6:
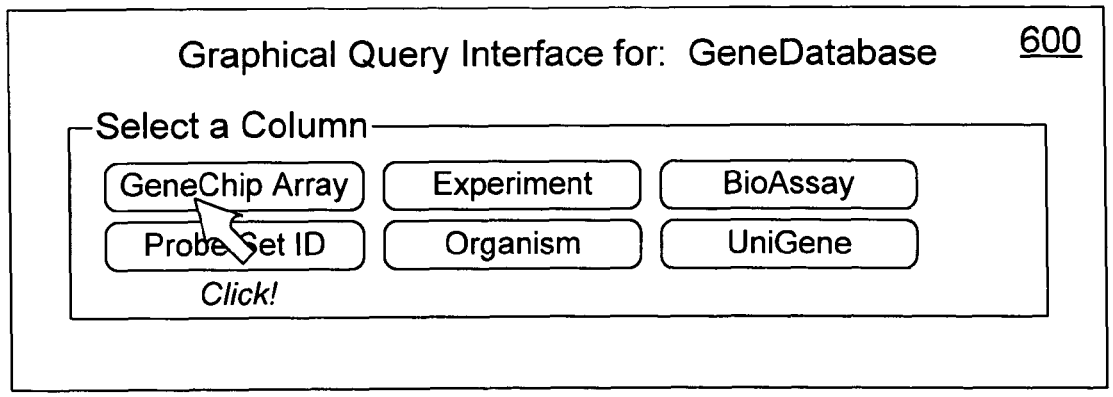
FIG. 6 is a display of a sample screen in a known graphical query interface that is displayed in response to the user selecting the Add Condition button in the display of FIG. 5.
Figure 7:
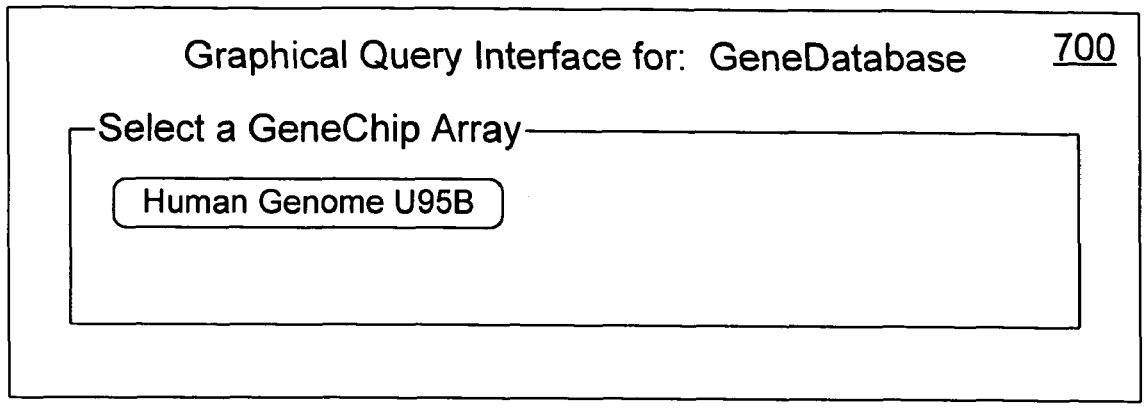
FIG. 7 is a display of a sample screen in a known graphical query interface that is displayed in response to the user selecting the GeneChip Array button in the display of FIG. 6.
Figure 8:
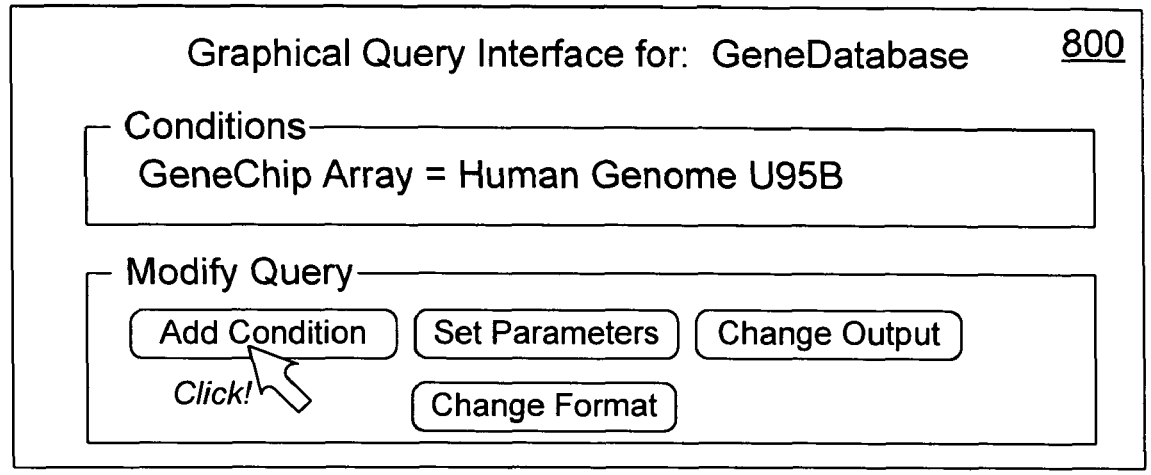
FIG. 8 is a display of a sample screen in a known graphical query interface that is displayed once the user has selected Human Genome U95B in the display of FIG. 7.
Figure 9:
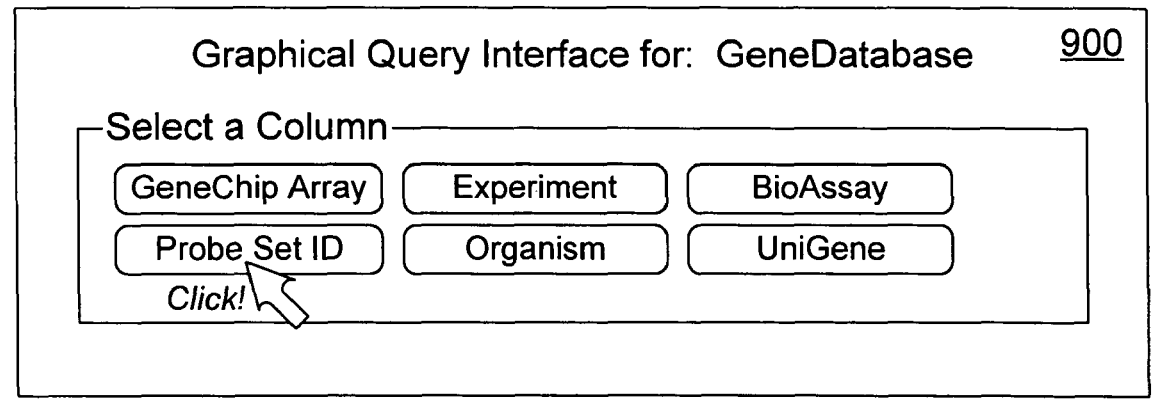
FIG. 9 is a display of a sample screen in a known graphical query interface that is displayed in response to the user selecting the Add Condition button in the display of FIG. 8.
Figure 10:
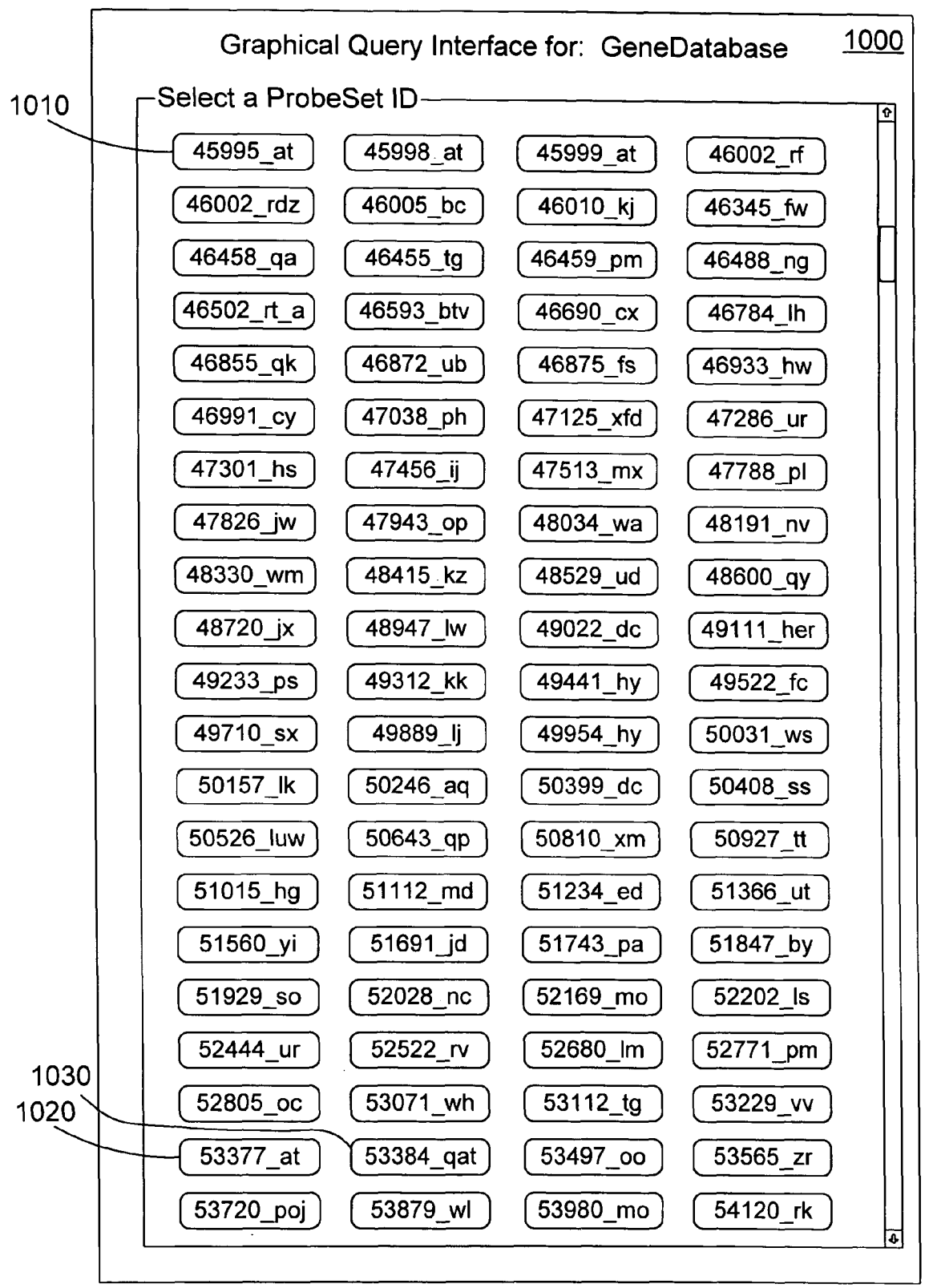
FIG. 10 is a display of a sample screen in a known graphical query interface that is displayed in response to the user selecting the Probe Set ID button in the display of FIG. 9.
Figure 11:
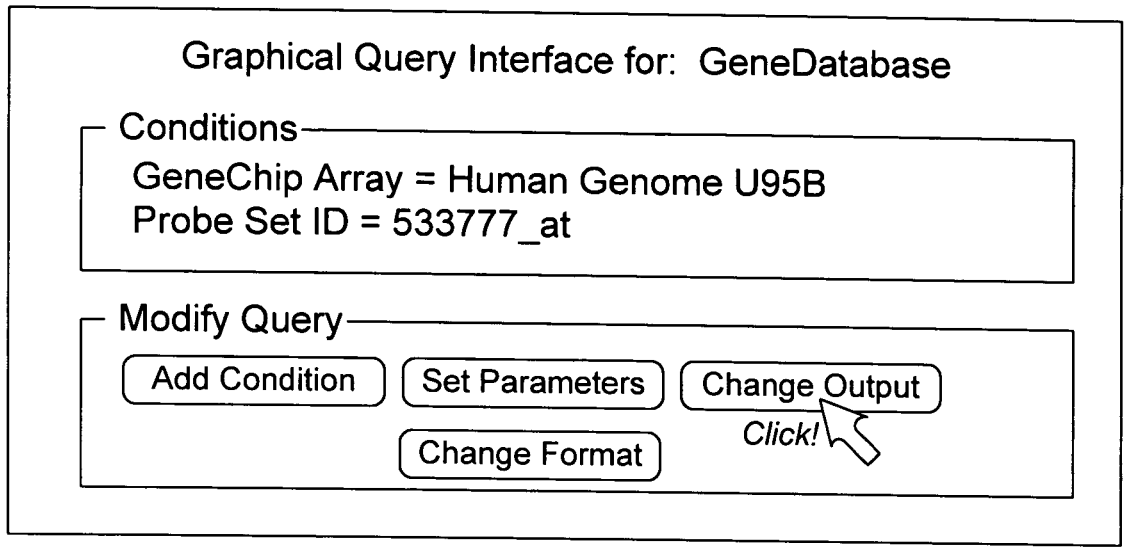
FIG. 11 is a display of a sample screen in a known graphical query interface that is displayed once the user has selected the 533777_at Probe Set ID in the display of FIG. 10.
Figure 12:
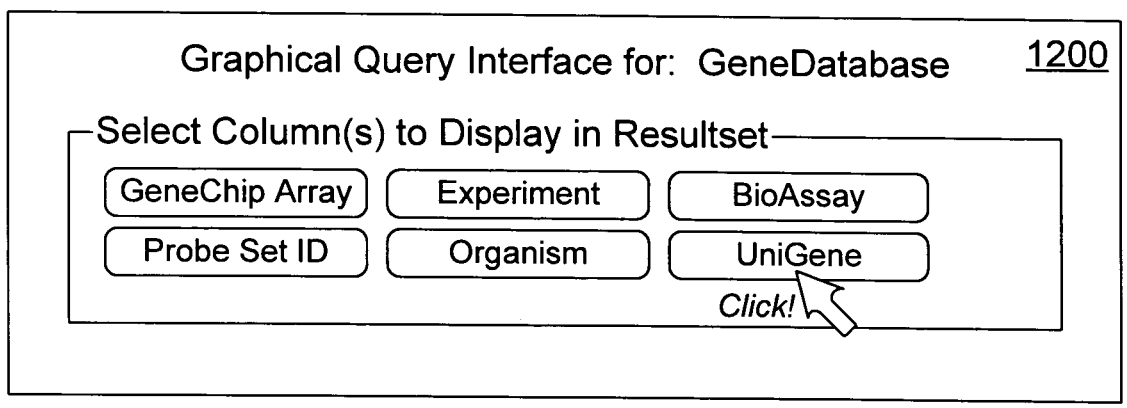
FIG. 12 is a display of a sample screen in a known graphical query interface that is displayed to allow the user to select one or more columns to display in the query resultset.

Referring to FIG. 4, a display window 400 shows a graphical query interface for a gene database. We assume for this example that the user clicks on the "Create a new query" link. In response, the display window 500 of FIG. 5 is displayed to the user. Note that no conditions have been defined for the new query, so the user clicks on the "Add Condition" button. In response, the display window 600 of FIG. 6 is displayed to the user. We assume for this example that the user selects the GeneChip Array by clicking on the corresponding button, as shown in FIG. 6. In response, the display window 700 is displayed to the user, showing all of the GeneChip Array entries in the database. For this example, we assume a single GeneChip Array named Human Genome U95B is the sole GeneChip Array in the database, so this is the sole button displayed to the user in FIG. 7. Once the user clicks on the Human Genome U95B button in the display window 700 of FIG. 7, the display window 800 of FIG. 8 is displayed to the user. Note that the Conditions portion of the display window 800 now shows that the user has selected the Human Genome U95B GeneChip Array. We assume the user now clicks on the Add Condition button, as shown in FIG. 8. In response, the display window 900 of FIG. 9 is displayed to the user. Note this display window presents the same selections as the display window 600 in FIG. 6. We assume the user now clicks on the Probe Set ID button, as shown in FIG. 9. In response, the list of Probe Set IDs are displayed to a user, as shown in FIG. 10. We assume for this example that there are thousands of Probe Set IDs in the database. The display window 1000 in FIG. 10 only shows a relatively small number, as indicated by the size of the scroll bar button to the right of the display window 1000. At this point, the user has no idea which Probe Set ID or IDs relate to the Human Genome U95B GeneChip Array that has already been selected, because the prior art graphical query interface displays all of the Probe Set IDs that exist in the database. As a result, the user may have to manually hunt through a paper trail to find which Probe Set IDs correspond to the Human Genome U95B GeneChip Array. We assume for this simple example that the selections 1010, 1020 and 1030 in FIG. 10 correlate to valid Probe Set IDs for the Human Genome U95B GeneChip Array. Yet the user is not provided with any of this information by the graphical query interface. Herein lies the primary deficiency in known graphical query interfaces. The user could easily select any of the Probe Set IDs shown in FIG. 10. Selecting any of the Probe Set IDs other than those corresponding to 1010, 1020 and 1030 results in selecting disjoint data, which results in the query returning no rows. Assuming the user somehow successfully identifies that Probe Set ID 5337_at is the desired Probe Set ID (from paper records or from some source of information external to the graphical query interface), the user clicks on button 1020. As a result, the display window 1100 of FIG. 11 is then displayed to the user. Note that the Conditions box now includes both the selections the user has already made. We assume the user clicks on the Change Output button, as shown in FIG. 11. As a result, the screen 1200 shown in FIG. 12 is displayed to the user, allowing the user to select one or more columns for display in the resultset. Once the query conditions are defined and the columns to display have been specified, the user could execute the query. However, because the graphical query interface illustrated in FIGS. 3-12 does not provide any visual feedback to the user regarding the quality of the query as it is being built, the user will have to wait until the query is actually executed before knowing whether or not the query will return the desired data.

2.0 Description of the Preferred Embodiments

The dynamic graphical query and data mining interface in accordance with the present invention provides graphical feedback to the user regarding the quality of the query while the query is being built. Database relationships are displayed to the user. When the user selects something in the database, the display of available selections is filtered according to the portion of the query that has already been constructed. In this manner the user is provided dynamic visual feedback regarding the quality of the query as the query is being built. Using this interface, a user may also mine data from the database because the relationships between database columns are shown, and because the displayed results are filtered according to the user's selections.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, and a graphical query and data mining interface 124. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more tables. Graphical query and data mining interface 124 provides a graphical query interface that provides dynamic feedback to the user that helps the user understand relationships in the database without destroying the abstractions provided by the interface, and in a way that helps the user build a useful query. The graphical query and data mining interface 124 includes a database relationship document 125 that specifies relationships in the database 123. A significant advantage of the preferred embodiments is the ability to specify relationships in the database relationship document 125 that span across different tables. The database relationship document 125 is preferably an extensible Markup Language (XML) document. By reading the database relationship document 125, the graphical query and data mining interface 124 may determine one or more relationships in the database 123, including relationships across multiple tables, which may then be displayed to a user.

The graphical query and data mining interface 124 also includes a filtered display mechanism 126. This mechanism helps the user to know the quality of the query as the query is being constructed. When a user makes a selection in the database, the information displayed to the user is then filtered by the filtered display mechanism 126 to only display information that satisfies all of the previous user selections. In this manner the amount of information presented to the user is reduced so the user can make more intelligent decisions regarding how to build a query that will return a desired number of rows. In addition, the user will know if the query being built will return no records during the construction of the query, thereby allowing the user to back up and specify one or more different selections that will return desired data. This is a huge improvement over the prior art, which allows the user to graphically build a query, but provides no indication of the quality of the query until the query is executed. At the point of executing the query, if the query returns no rows, or thousands of rows, the query is probably not terribly useful to the user. The filtered display mechanism 126 presents only information that meets the criteria of information that the user has previously selected. In this manner the user receives a visual indication of the quality of the query as the query is being built.

Due to the dynamic visual feedback provided by the user, the graphical query and data mining interface 124 may be easily used to mine data from a database. As the user adds selections to the query, the results are repeatedly narrowed and filtered to display only those selections that meet all of the previously-selected criteria. As a result, the interface 124 is a very effective tool for a user to mine data from the database 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, and graphical query and data mining interface 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 2:
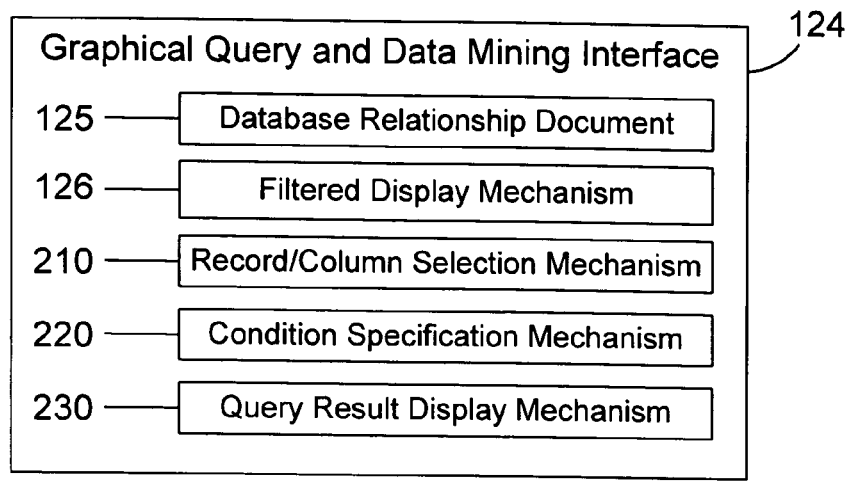
FIG. 2 is a block diagram of the graphical query and data mining interface shown in FIG. 1.

Referring now to FIG. 2, additional details of the graphical query and data mining interface 124 shown in FIG. 1 include a record/column selection mechanism 210, a condition specification mechanism 220, and a query result display mechanism 230. The record/column selection mechanism 210 allows a user to select appropriate columns or rows in the database for inclusion in the query being built. The condition specification mechanism 220 allows specifying conditions for the query, such as ranges, arithmetic operators, logical operators, etc. The query result display mechanism 230 displays to the user the results of executing the query.

Figure 13:
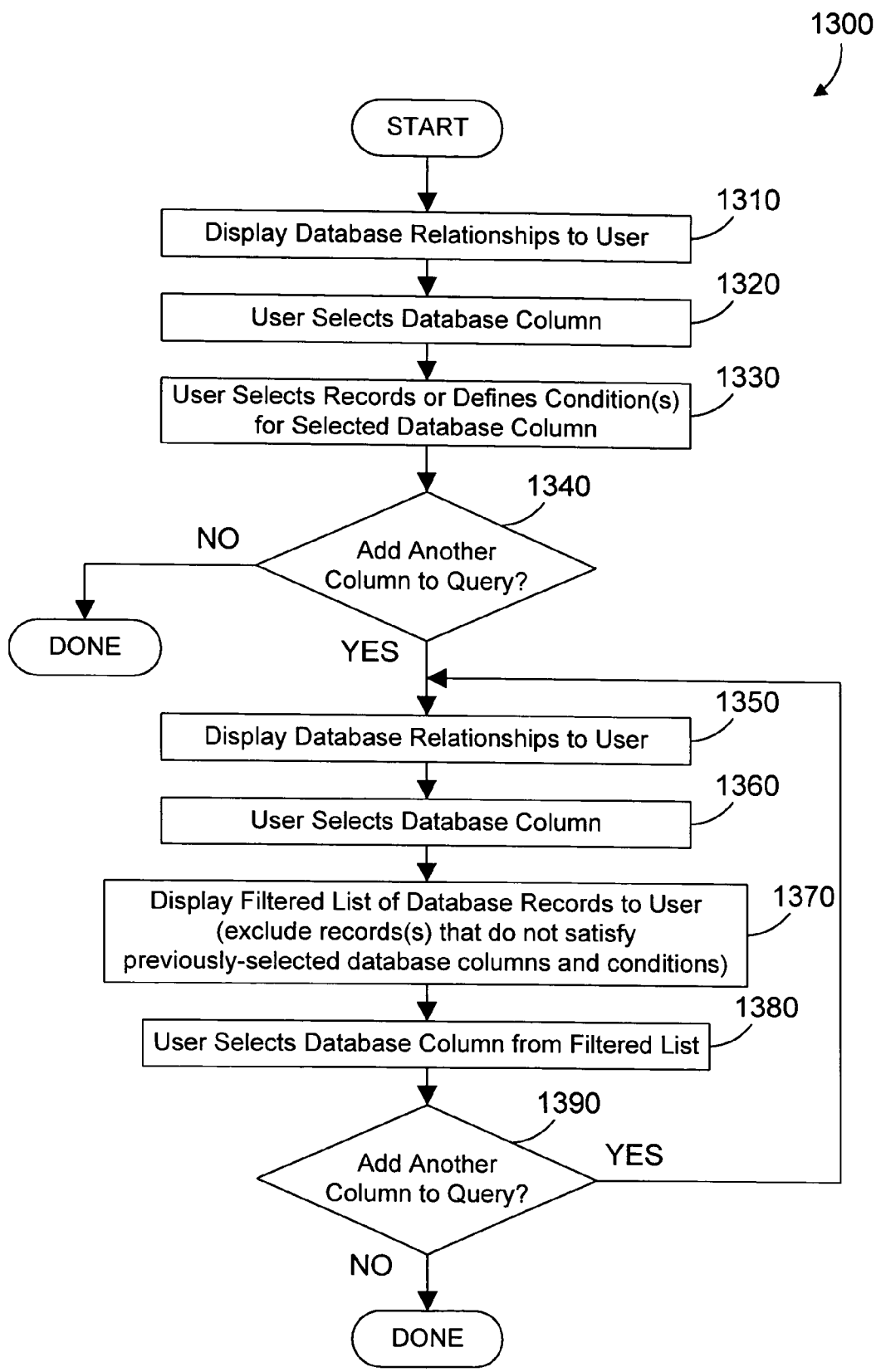
FIG. 13 is a flow diagram of a method executed by the graphical query and data mining interface in accordance with the preferred embodiments.
Figure 14:
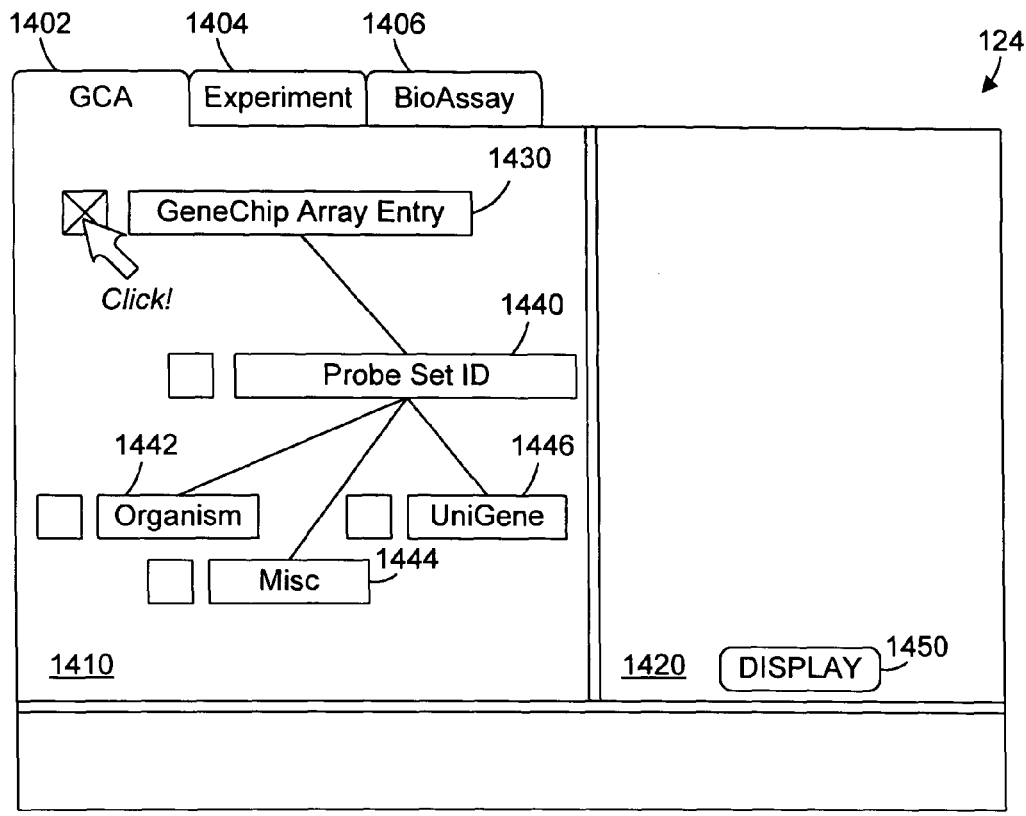
FIG. 14 is a display of the graphical query and data mining interface in FIGS. 1 and 2 that displays database relationships in accordance with the preferred embodiments.
Figure 15:
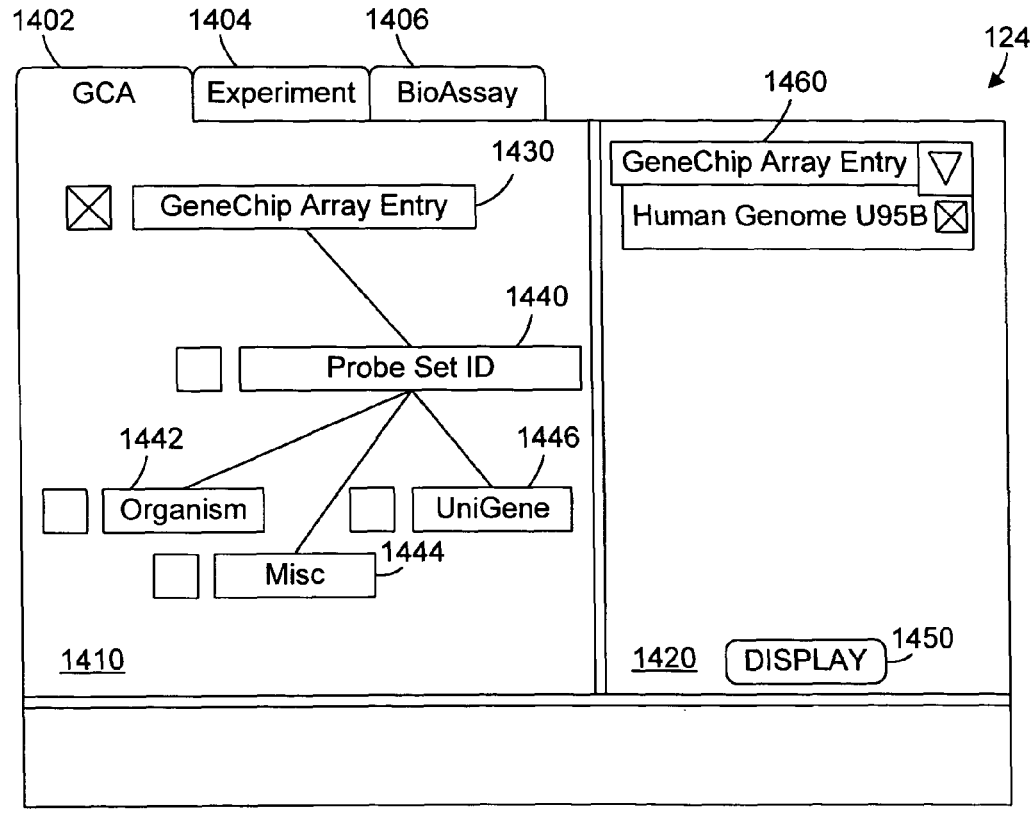
FIG. 15 is a display of the graphical query and data mining interface in FIGS. 1 and 2 that shows the filtered display of information that results from the user selecting the GeneChip Array Entry in FIG. 14, and that allows the user to select from the display selections for GeneChip Array Entries.

Referring to FIG. 13, a method 1300 in accordance with the preferred embodiments begins by displaying database relationships to the user (step 1310). The database relationships are preferably determined by the graphical query and data mining interface reading the corresponding database relationship document 125 (such as an XML document) that defines the relationships between data in the database. For example, in the field of Microarray research, a standard known as MicroArray Gene Expression (MAGE) is evolving. A standard for MAGE is maintained using the XML format called MAGE-ML. MAGE consists of various different packages, and each package has various data elements associated with it. These relationships could be represented in a tree structure. The MAGE-ML XML file is one specific example of a suitable database relationship document 125 in accordance with the preferred embodiments. Any type of document that provides any information regarding one or more relationships in the database is within the scope of the database relationship document 125.

The user selects a database column from the displayed relationships (step 1320). The user then selects records or defines one or more conditions for the selected database column (step 1330). If no more columns need to be added to the query (step 1340=NO), method 1300 is done. If more columns need to be added to the query (step 1340=YES), the database relationships are again displayed to the user (step 1350). The user then selects a database column from the list (step 1360). The list of possible values is then filtered according to the user's previous selections and displayed to the user (step 1370). The user then selects a database column from the filtered list (step 1380). If another column needs to be added to the query (step 1390=YES), method 1300 loops back to step 1350 and continues. If no other columns need to be added to the query (step 1390=NO), method 1300 is done.

A simple example is shown in FIGS. 14-21 that illustrates the advantages of the graphical query and data mining interface 124 of the preferred embodiments. We assume the interface 124 includes multiple tabs 1402, 1404 and 1406. The 1402 tab is selected in all of FIGS. 14-21 for the purpose of illustration, resulting in the display of a corresponding window 1410 that displays database relationship information for GeneChip Arrays (GCA) to the user. We assume that the database relationship information stored in the database relationship document 125 in FIG. 1 includes the relationships displayed graphically in window 1410, namely: a GeneChip Array Entry 1430 includes one or more Probe Set IDs 1440, which includes one or more Organism 1442, Misc 1444, and UniGene 1446. Note that Misc 1444 is representative of any suitable number of additional selections below the Probe Set ID 1440. With this database relationship tree displayed in window 1410, a user may now select the GeneChip Array Entry 1430 by clicking on the box next to it, as shown in FIG.

14. In response, the display window 1420 to the right displays the user's selection, as shown as 1460 in FIG. 15. Note that the GeneChip Array Entry 1460 includes a drop-down list that displays all of the GeneChip Array Entries in the database. For this example, we assume that there is a single GeneChip Array Entry named Human Genome U95B that appears in the drop-down list, so we assume the user selects the Human Genome U95B, as shown by the X in the box to the right of the selection in the drop-down list in FIG. 15.

Figure 16:
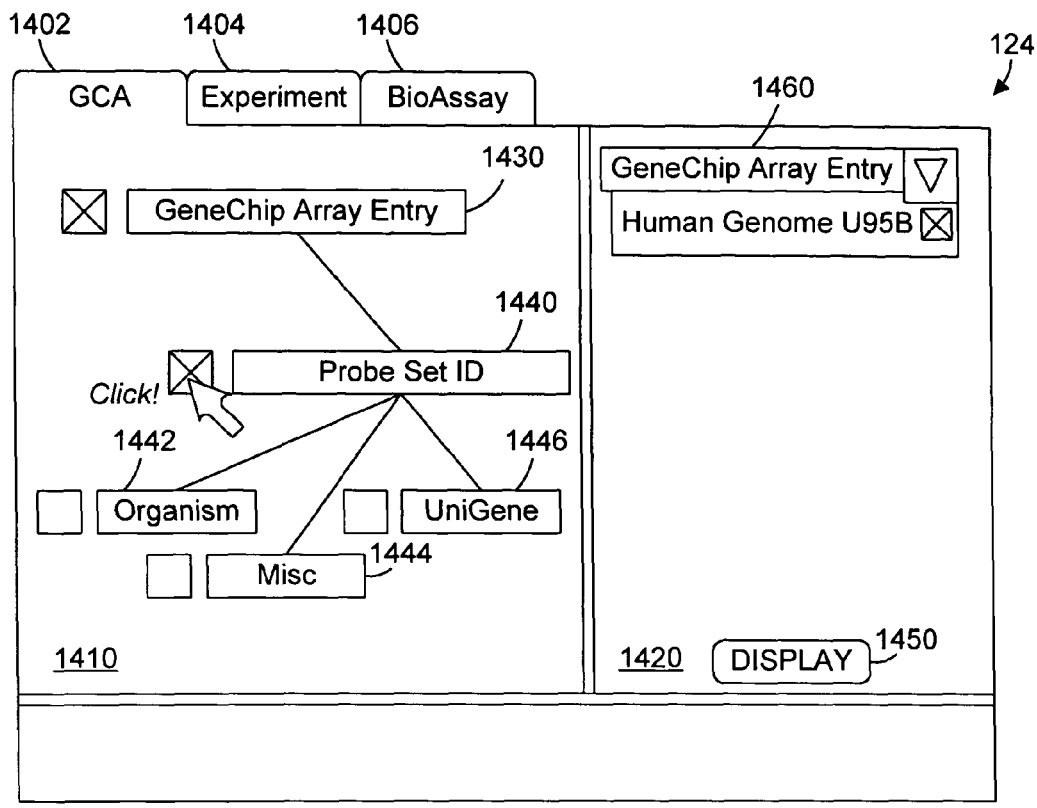
FIG. 16 is a display of the graphical query and data mining interface in FIGS. 1 and 2 when the user selects the Probe Set ID.

Now that the user has selected the desired GeneChip Array Entry in the database, the user may now go back to the relationship diagram in window 1410 and click on the Probe Set ID box, as shown in FIG. 16. In response to the user selecting the Probe Set ID box, the Probe Set ID 1470 is displayed in the window 1420 to the right in FIG. 17. This Probe Set ID 1470 includes a drop-down list. Note, however, that the drop-down list does not include thousands of Probe Set IDs, as depicted in the prior art in FIG. 10. Instead, the list of Probe Set IDs is filtered to display only those Probe Set IDs that correspond to the Human Genome U95B that the user previously selected. This is one of the extremely powerful aspects of the graphical query and data mining interface 124 of the preferred embodiments. With each selection the user makes in window 1420, the future possibilities are filtered according to those selections already made. As a result, the user gets a visual indication of the quality of the query before the query is executed. This also allows for data mining since the graphical indication helps direct the user to certain data.

Figure 17:
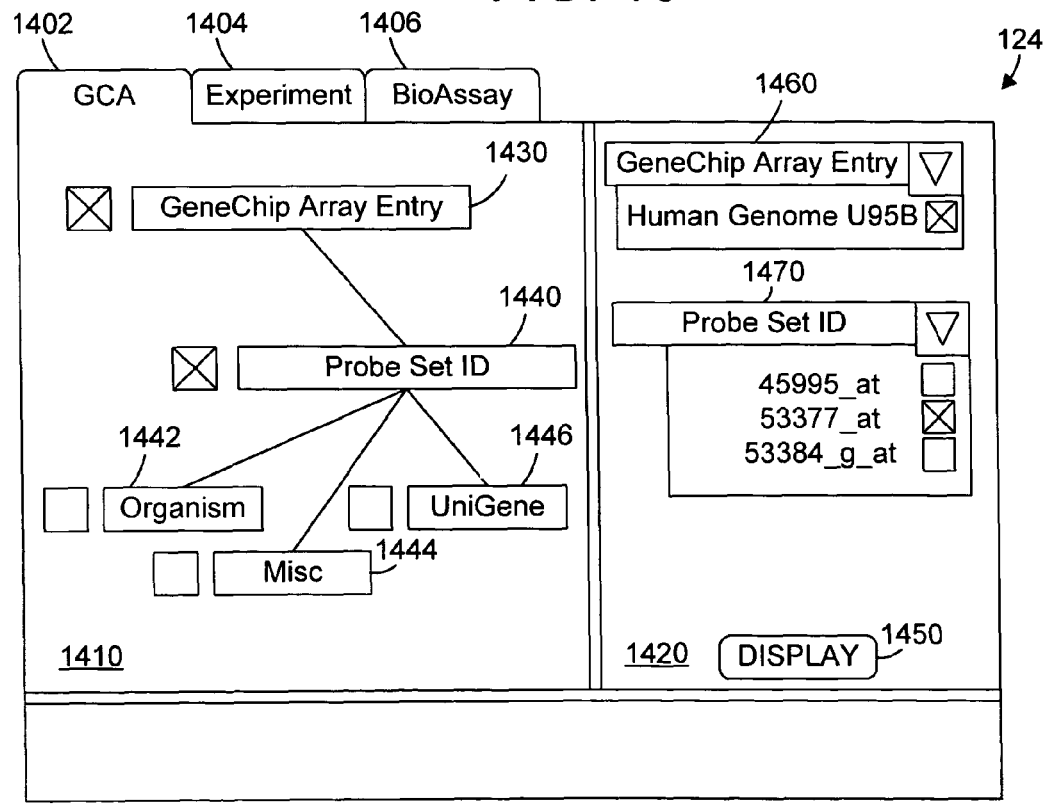
FIG. 17 is a display of the graphical query and data mining interface in FIGS. 1 and 2 that shows the filtered display of information that results from the user selecting the Probe Set ID in FIG. 16, and that allows the user to select from the filtered display selections for Probe Set ID.
Figure 18:
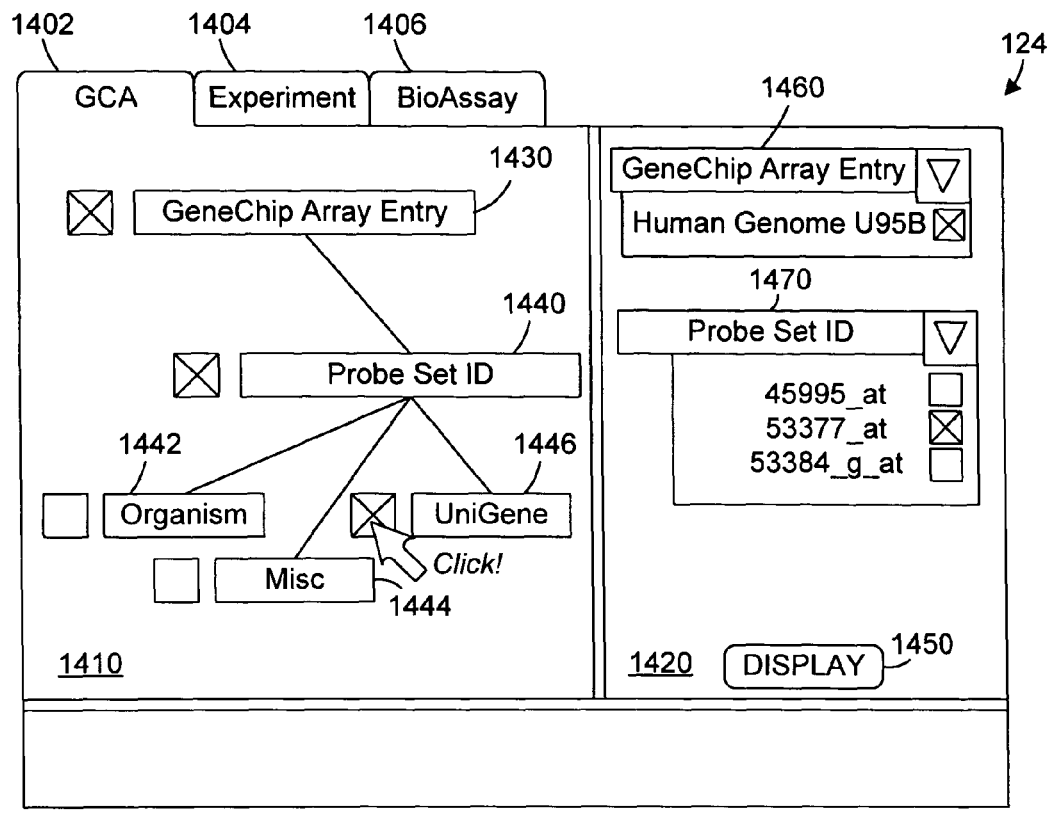
FIG. 18 is a display of the graphical query and data mining interface in FIGS. 1 and 2 when the user selects UniGene.
Figure 19:
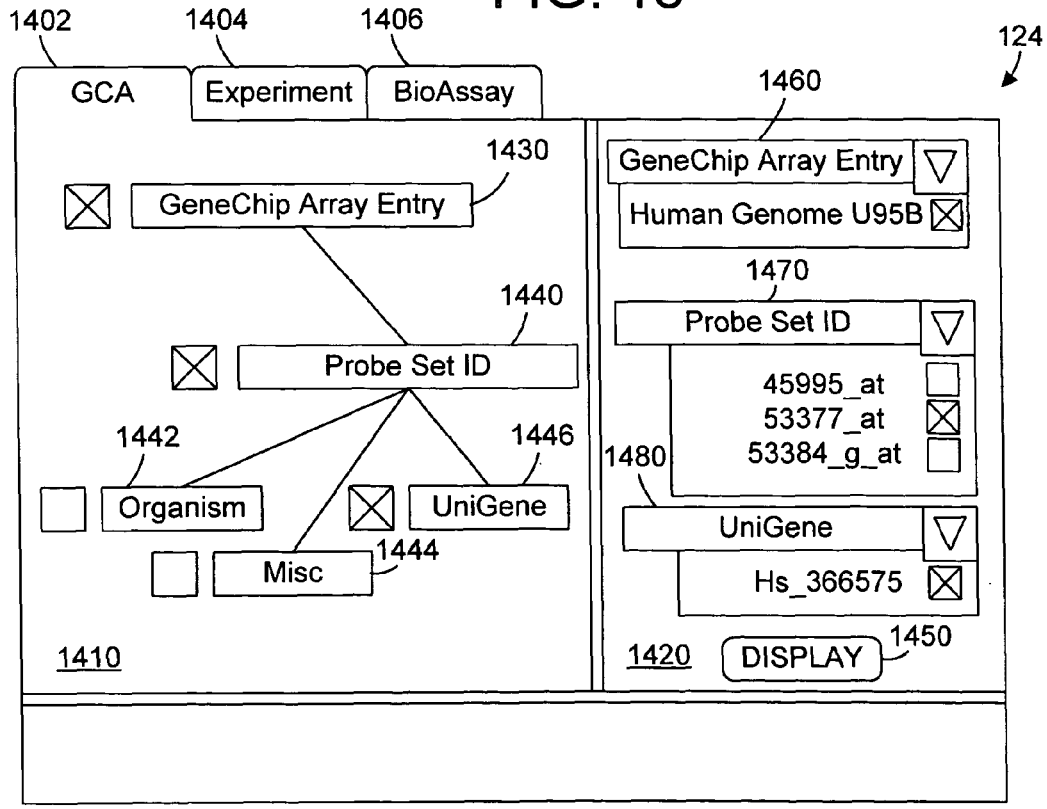
FIG. 19 is a display of the graphical query and data mining interface in FIGS. 1 and 2 that shows the filtered display of information that results from the user selecting UniGene in FIG. 18, and that allows the user to select from the filtered display selections for UniGene.
Figure 20:
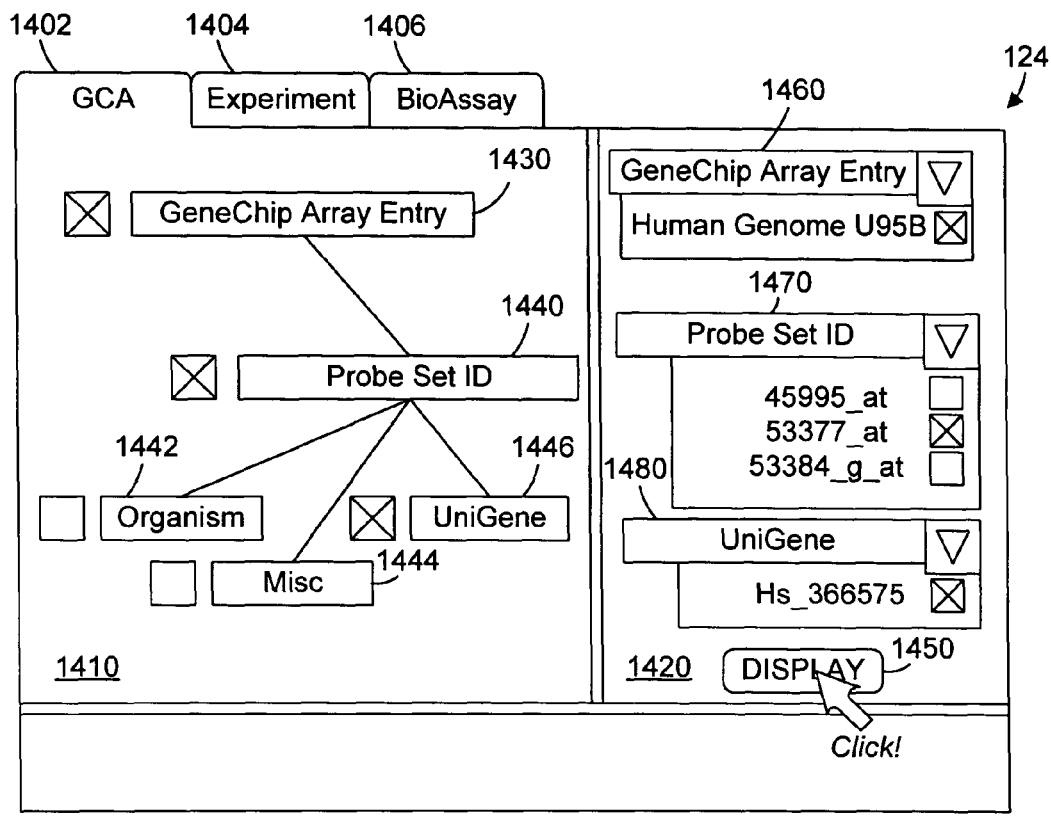
FIG. 20 is a display of the graphical query and data mining interface in FIGS. 1 and 2 when the user selects the Display button.
Figure 21:
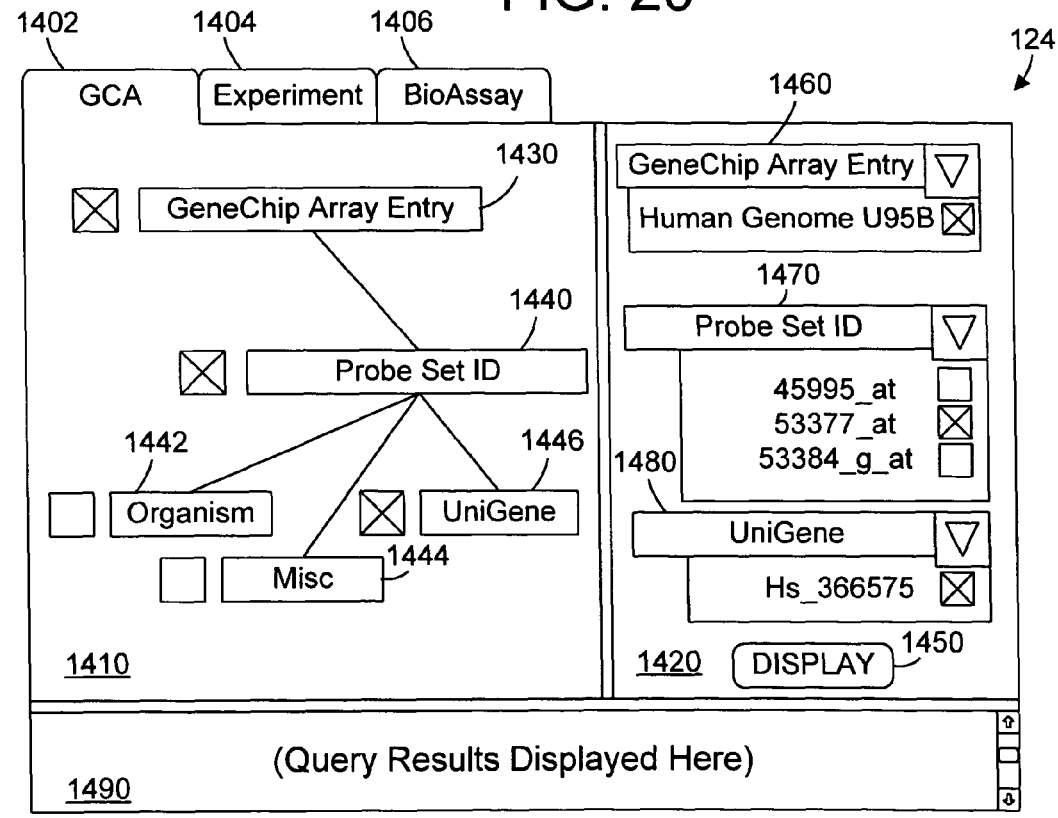
FIG. 21 is a display of the graphical query and data mining interface in FIGS. 1 and 2 that shows the results of executing the query.

We assume the user selects the Probe Set ID 53377_at from the drop-down list, as shown in FIG. 17. Now the user may go back to the relationship diagram in window 1410 and click on the UniGene item 1446, as shown in FIG. 18. When the UniGene item is clicked in FIG. 18, a UniGene 1480 is displayed in the window 1420 of FIG. 19. Note that the UniGene 1480 includes a drop-down list that is filtered to show only the UniGenes that satisfy the two earlier user selections above (namely, GeneChip Array Entry=Human Genome U95B, and Probe Set ID=53377_at). There may be thousands or millions of UniGenes, but filtering the list according to the previous selections narrows the list to a single UniGene, namely Hs__366575, as shown in FIG. 19. We assume the user selects Hs__366575 as shown in window 1420 of FIG. 19. At this point the user decides the query is complete, and clicks on the Display button 1450, as shown in FIG. 20. The query results are then displayed in a separate window 1490, as depicted in FIG. 21.

The great power provided by the graphical query and data mining interface in accordance with the preferred embodiments comes from displaying database relationship information to the user in a way that does not affect the data abstraction provided by the graphical query interface, and from filtering displayed results according to previous user selections. In this manner the user is provided with a graphical indication of the quality of the query as the query is constructed. Thus, if a selection would cause no data to be returned, the user will have a visual indication of this while the query is being built, and can then make appropriate changes to the query to retrieve valid data. In addition, if a query would cause too many records to be returned, the user will generally have a visual indication of this before the query is even executed, thereby allowing the user to modify the query to narrow it down to retrieve a suitable number of records.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, it is within the scope of the preferred embodiments to actually run a partial query in a background process as the user continues to build the query, and to display a number of rows that the query returns. In this manner the use will have information retrieved from the database regarding the number or rows the query will return in making future selections when continuing the construction of the query.

What is claimed is:

1. An apparatus comprising:
   at least one processor;
   a memory coupled to the at least one processor;
   a database residing in the memory; and
   a graphical query interface residing in the memory and executed by the at least one processor, the graphical query interface determining at least one relationship in the database by reading a database relationship document corresponding to the database and displaying a graphical representation of the at least one relationship in the database to a user when building a query in a series of steps, the graphical representation comprising at least one item in the database that the user may select and in response to a user selection on the graphical representation in building the query in the series of steps, the graphical query interface filtering display of information to the user at each step in building the query according to all user selections on the graphical representation in all previous steps.

2. The apparatus of claim 1 wherein the database relationship document comprises an XML document.

3. The apparatus of claim 1 wherein the graphical query interface supports data mining by displaying the filtered display of information to the user.

4. The apparatus of claim 1 wherein the graphical query interface displays a number of rows in the database that satisfy the query.

5. An apparatus comprising:
   at least one processor;
   a memory coupled to the at least one processor;
   a database table residing in the memory;
   a database relationship document residing in the memory that specifies at least one relationship in the database; and
   a graphical query interface residing in the memory and executed by the at least one processor, the graphical query interface comprising:
      a first window that displays a graphical representation of at least one relationship in the database specified in the database relationship document when building a query in a series of steps, the graphical representation comprising at least one item in the database that the user may select; and
      a second window that displays filtered information to the user at each step in building the query according to all user selections on the graphical representation in all previous steps in building the query.

6. The apparatus of claim 5 further comprising a third window that displays results of executing the query.

7. The apparatus of claim 6 wherein a number of rows that satisfy the query are displayed in the third window.

8. The apparatus of claim 5 wherein the database relationship document comprises an XML document.

9. The apparatus of claim 5 wherein the graphical query interface supports data mining by displaying the filtered display of information to the user.

10. A method for a user to build a query to a database, the method comprising the steps of:
- determining at least one relationship in the database by reading a database relationship document corresponding to the database;
- displaying to a user a graphical representation of at least one relationship in the database, the graphical representation comprising at least one item in the database that the user may select; and
- in response to a user selection on the graphical representation in building the query in a series of steps, displaying information to the user at each step that is filtered according to all user selections on the graphical representation in all previous steps.

11. The method of claim 10 wherein the database relationship document comprises an XML document.

12. The method of claim 10 further comprising the step of displaying a number of rows in the database that satisfy the query.

13. A method for a user to build a query to a database, the method comprising the steps of:
- displaying in a first window a graphical representation of at least one relationship in the database specified in a database relationship document when building a query in a series of steps, the graphical representation comprising at least one item in the database that the user may select; and
- displaying in a second window information that is filtered at each step in building the query according to all user selections on the graphical representation in all previous steps.

14. The method of claim 13 comprising the step of displaying in a third window results of executing the query.

15. The method of claim 14 wherein the results of executing the query include a number of rows that satisfy the query.

16. The method of claim 13 wherein the database relationship document comprises an XML document.

17. A computer-readable program product comprising:
(A) a graphical query interface that determines at least one relationship in a database by reading a database relationship document corresponding to the database and displays a graphical representation of the at least one relationship in the database to a user when building a query in a series of steps, the graphical representation comprising at least one item in the database that the user may select and in response to a user selection on the graphical representation in building the query in the series of steps, the graphical query interface filtering display of information to the user at each step in building the query according to all user selections on the graphical representation in all previous steps; and
(B) recordable media bearing the graphical query interface.

18. The program product of claim 17 wherein the database relationship document comprises an XML document.

19. The program product of claim 17 wherein the graphical query interface supports data mining by displaying the filtered display of information to the user.

20. The program product of claim 17 wherein the graphical query interface displays a number of rows in the database that satisfy the query.

21. A computer-readable program product comprising:
(A) a graphical query interface comprising:
- a first window that displays a graphical representation of at least one relationship in a database specified in a database relationship document when building a query in a series of steps, the graphical representation comprising at least one item in the database that the user may select; and
- a second window that displays filtered information to the user at each step in building the query according to all user selections on the graphical representation in all previous steps; and
(B) recordable media bearing the graphical query interface.

22. The program product of claim 21 further comprising a third window that displays results of executing the query.

23. The program product of claim 22 wherein a number of rows that satisfy the query are displayed in the third window.

24. The program product of claim 21 wherein the database relationship document comprises an XML document.

25. The program product of claim 21 wherein the graphical query interface supports data mining by displaying the filtered display of information to the user.

26. An apparatus comprising:
- at least one processor;
- a memory coupled to the at least one processor;
- a database residing in the memory; and
- a graphical query interface residing in the memory and executed by the at least one processor, the graphical query interface determining at least one relationship in the database by reading an extensible markup language (XML) document corresponding to the database and displaying in a first window a graphical representation of the at least one relationship in the database to a user when building a query in a series of steps, wherein the graphical representation comprises at least one item in the database that the user may select, and in response to a user selection on the graphical representation in building the query in the series of steps, the graphical query interface filters display of information to the user in a second window at each step in building the query according to all user selections on the graphical representation in all previous steps, displays the filtered display of information to the user, and displays a number of rows in the database that satisfy the query in a third window.

27. A method for a user to build a query to a database, the method comprising the steps of:
- determining the at least one relationship in the database by reading an extensible markup language (XML) document corresponding to the database;
- displaying to a user in a first window a graphical representation of at least one relationship in the database when building a query in a series of steps, wherein the graphical representation comprises at least one item in the database that the user may select;
- displaying in a second window information to the user that is filtered at each step in building the query according to all user selections on the graphical representation in all previous steps; and
- displaying a number of rows in the database that satisfy the query in a third window.

28. A computer-readable program product comprising:
(A) a graphical query interface that determines the at least one relationship in a database by reading an extensible markup language (XML) document corresponding to the database and displays in a first window a graphical representation of the at least one relationship in the database to a user when building a query in a series of steps, wherein the graphical representation comprises at least one item in the database that the user may select, and in response to a user selection on the graphical representation in building the query in the series of steps, the graphical query interface filters display of information in a second window to the user at each step in building the query according to all user selections on the graphical representation in all previous steps, supports data mining by displaying the filtered display of information to the user at each step in building the query, and displays a number of rows in the database that satisfy the query in a third window; and (B) recordable media bearing the graphical query interface.

* * * * *